F. E. BOND.
ANTISKIDDING DEVICE FOR MOTOR VEHICLE TIRES.
APPLICATION FILED MAR. 23, 1912.

1,046,954.

Patented Dec. 10, 1912.

Witnesses
Marshall Low
L. O. Brady

Inventor
Frank E. Bond
By John S. Barker
His Attorney

UNITED STATES PATENT OFFICE.

FRANK E. BOND, OF WALTON, NEW YORK.

ANTISKIDDING DEVICE FOR MOTOR-VEHICLE TIRES.

1,046,954. Specification of Letters Patent. Patented Dec. 10, 1912.

Application filed March 23, 1912. Serial No. 685,756.

*To all whom it may concern:*

Be it known that I, FRANK E. BOND, a citizen of the United States, residing at Walton, in the county of Delaware and State of New York, have invented certain new and useful Improvements in Antiskidding Devices for Motor-Vehicle Tires, of which the following is a specification.

My invention relates to devices adapted to be applied to pneumatic or other tires for motor vehicles for the purpose of increasing the tractive power thereof and preventing slipping and skidding.

It consists of a series of linked together calks of peculiar construction adapted to be easily applied to or removed from the wheel at pleasure; and has for its object to produce a device of this kind that is reliable and especially adapted for use upon icy roadways, that possesses great strength, is not liable to break or get out of order when applied to a wheel, and may be easily and cheaply manufactured.

Figure 1:
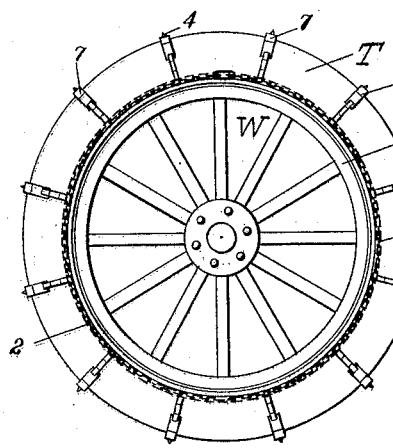
Figure 2:
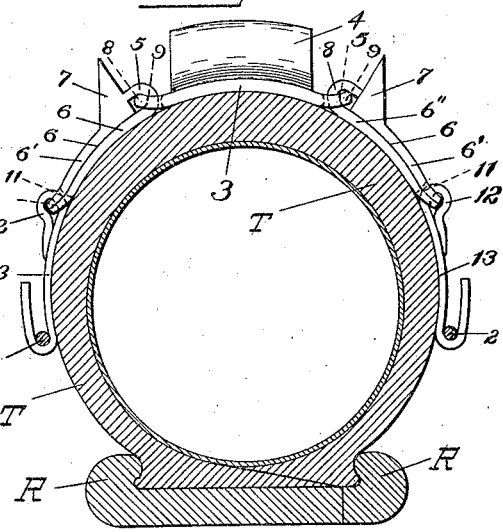
Figure 3:
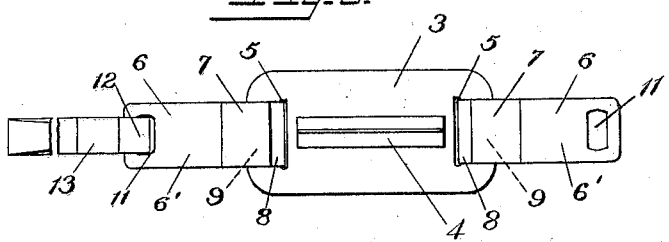
Figure 4:
Figure 5:
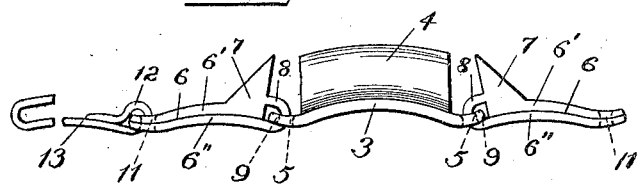
Figure 6:
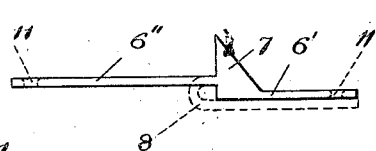
Figure 7:
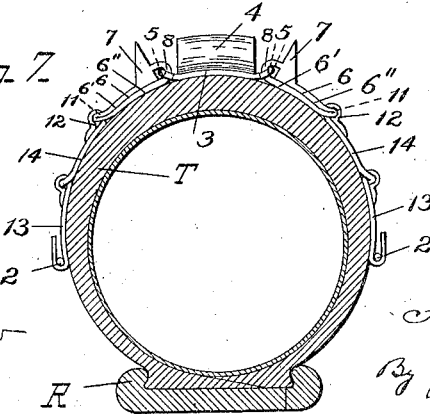

In the accompanying drawings—Figure 1 is a side view of a wheel to the tire of which my invention is applied. Fig. 2 is a transverse sectional view through the tire of the wheel, drawn on a much larger scale than Fig. 1. Fig. 3 is a plan view of one set of the calks and associated attaching parts laid flat. Fig. 4 is a central transverse sectional view of the central link of one of the antiskidding devices. Fig. 5 is a side elevation of the parts illustrated in Fig. 3. Fig. 6 is a side elevation of one of the side calks detached and as it appears before being connected with the other parts of the device. Fig. 7 is a cross sectional view through a tire illustrating a form of the invention somewhat different from that shown in the other views.

Referring to the drawings, W designates a wheel of a motor vehicle, and T the tire thereof. As my invention is especially adapted for use upon a tire of the pneumatic type, I have, in the drawings, illustrated such a form of tire.

The anti-skidding device which I have invented comprises a series of linked together calks which devices are applied to the exterior of the tire at suitable intervals apart, they being arranged transversely across the tread surface of the tire, as represented in Fig. 1. They are held in place upon the tire by chains, flexible bands, or other suitable securing means, designated 2 in the drawings, arranged at the sides of the tire close to the rim R of the wheel. But as the particular means employed for holding the anti-skidding devices in place upon the wheel do not constitute my invention, and numerous means for this purpose are known in the art, I will not describe nor illustrate them in detail.

As the sets of anti-skidding devices are duplicates of each other, it is necessary to describe but one. A set consists, essentially, of a center plate carrying a transverse rib or calk, and a pair of side plates or links connected with the center plate and carrying short longitudinally arranged calks. With these are associated connecting links, one or more at each side, as may be necessary. The central member of a set of anti-skidding devices, consists of a plate 3, somewhat curved on its under surface to conform more or less closely with the exterior of the tread of the tire, and carrying a centrally disposed, comparatively long, calk 4, transversely arranged with reference to the tire to which the device is applied, and formed with a comparatively sharp edge. The plate near its ends is perforated, as indicated at 5, 5, so as to facilitate linking the side calk members thereto. The plate 3 and the calk 4 which it carries are preferably formed of a single unitary piece of metal, and are given their shape by suitable forging mechanism. The side calk members are likewise each preferably formed of a single unitary piece of metal, and comprise a plate portion 6 adapted to rest upon the periphery of the tire immediately to one side of the central tread part thereof, and a short calk 7. The latter has a sharp edge which is disposed at right angles to the edge of the calk 4, that is to say, it is disposed longitudinally with reference to the circumference of the tire. The calk 7 is preferably substantially triangular in cross section. From one of its sides and as a continuation of the base thereof, there projects a plate 6', and from the opposite side extends a plate 6'', the latter joining the calk between its base and edge, as indicated in Fig. 5. In assembling the parts of the devices the plate 6'' is passed through an opening 5 in the plate of the central member and is then bent, as indicated by dotted lines in Fig. 6, so as to form a loop 8 surrounding the cross bar 9 at the end of the plate 3. When thus bent the two plates 6' and 6'' lie together face to face in superposed relation, with the loop 8 disposed between the central transverse calk 4 and a lateral longitudinal calk 7, so that it is by this arrangement prevented from severe contact with the road surface, which would tend to close or misshape the loop, and thus interfere with free articulation between the parts of the device. The ends of the plates 6′, 6″, are perforated as indicated at 11, and these perforations register when the calks are properly assembled. Into these openings pass the connecting links 12 that serve to unite the set of anti-skidding calks with the chains or securing devices 2, the links that immediately engage with the devices 2 being formed with hooks 13. The hook-carrying links 12 may engage directly with the plates 6 of the lateral calks, as represented in Figs. 2 and 3, or there may be an intermediate set of links, 14, between such plates and the hook-carrying links 13, as represented in Fig. 7.

An anti-skidding device such as described is, as already stated, especially adapted for use upon icy roads, as the lateral calks, the edges of which are longitudinally disposed, prevent sidewise slipping or skidding of the wheels, while the central calks insure a good engagement with the surface of the road and prevent the slipping of the wheels.

What I claim is:—

In an anti-skidding device for tires of motor vehicles, a central member carrying a transversely arranged calk and lateral members articulated thereto and each comprising a longitudinally arranged substantially triangular calk, and a pair of plates extending from opposite sides thereof, one being a continuation of the base of the calk and the other extending from the calk between its base and edge, the latter plate being bent to form a loop serving to link its calk member with the central calk member.

FRANK E. BOND.

Witnesses:
LOUIS MILLER,
ANNA B. BOND.

---

Copies of this patent may be obtained for five cents each, by addressing the "Commissioner of Patents, Washington, D. C."